United States Patent Office
3,207,289
Patented Sept. 21, 1965

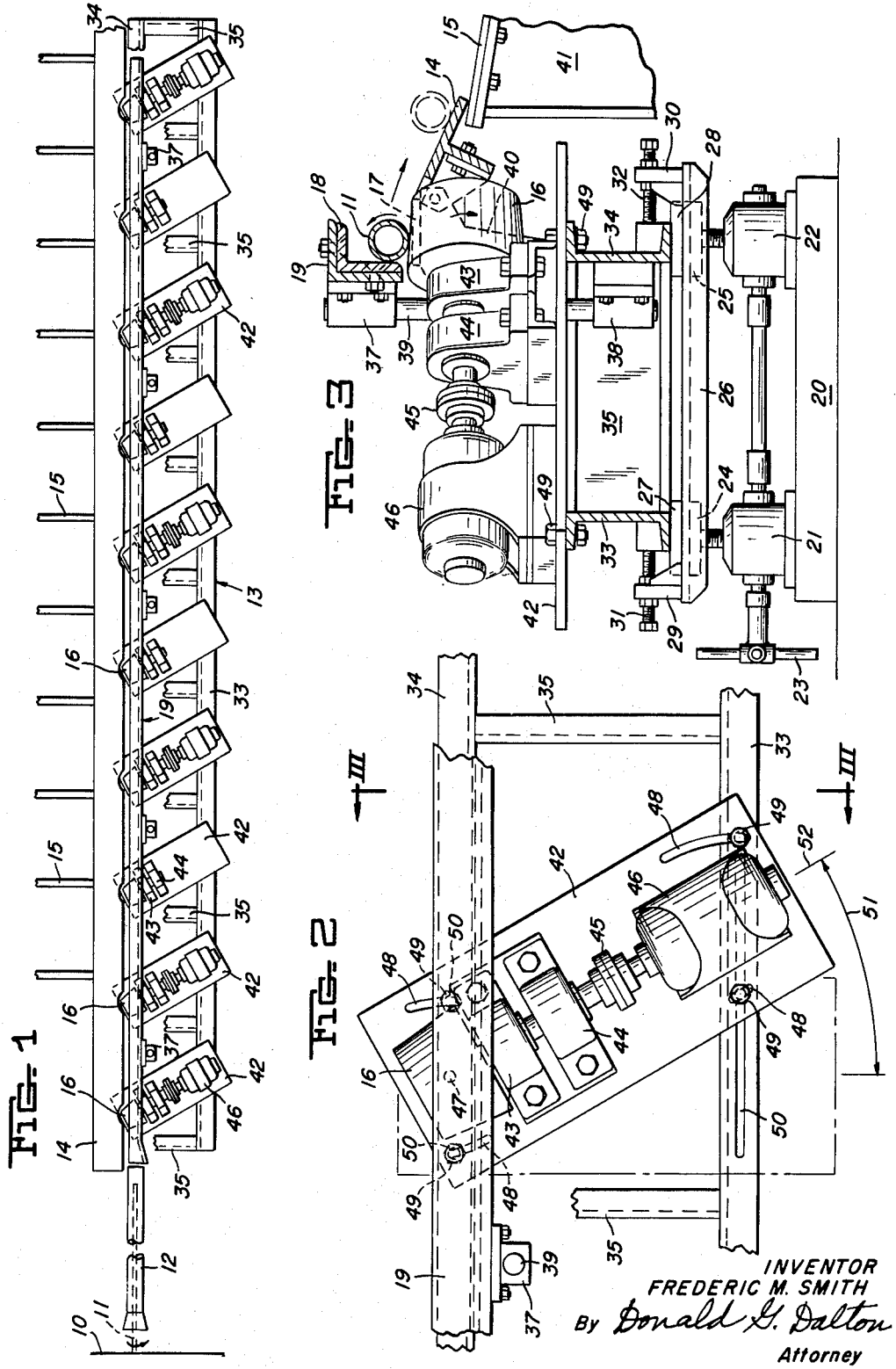

3,207,289
APPARATUS FOR DELIVERING PIPE LENGTHS SIDEWISE AS DISCHARGED FROM ROTARY STRAIGHTENER OR THE LIKE
Frederic M. Smith, Morrisville, Pa., assignor to United States Steel Corporation, a corporation of New Jersey
Filed Apr. 29, 1963, Ser. No. 276,653
5 Claims. (Cl. 198—107)

This invention relates to apparatus for delivering rotating, elongated workpieces sidewise as they are discharged from processing apparatus. More particularly, it relates to apparatus for delivering pipe lengths or the like sidewise as they are discharged from a rotary straightener.

In the manufacture of pipe, after hot rolling and other steps to produce a tube length of uniform dimensions, it is usually necessary to cold straighten the product to come within commercial tolerances. Most of this straightening of pipe, or of round bars to which the same principles apply, is done on rotary crossed-roll straightening machines. These machines, having roll axes set at an angle of much less than 90°, i.e., usually about 25° to 40° to the axis of the pipe being straightened, rapidly rotate the pipe as it moves axially through the machine. The capacity of such machines is dependent not only on the speed of the pipe through the straightener, but also on how close together the individual pieces may be charged.

Speeds through the straightener may exceed 1,000 feet per minute and problems therefore arise in handling the pipe at the outlet end. For best results, each pipe length should be fully supported and confined in a predetermined path while it is gripped by the straightener rolls and until after discharge, the length clears the usual outlet guide. Then it must be moved sidewise, either to roll to the next operation or into cradles for accumulation.

To move the pipe sidewise, one of two means has been employed. In one, a kickout apparatus pushes the pipe sidewise when it clears the straightener. To permit time for retraction of all the kickout elements to avoid interference with an oncoming pipe necessitates running the straightener with a gap between succeeding lengths. This reduces straightener output below its maximum. The other means utilizes a deflector plate adapted to be engaged by the forward end of the pipe, thus causing successive lengths to be deflected from the outlet conveyor. This results in pipe-end damage and lower straightener output. Again, a gap must be left between succeeding lengths to avoid interference between the trailing end of the deflected pipe and the leading end of the next pipe.

It is therefore an object of my invention to provide improved apparatus to overcome the disadvantages of prior art apparatus and to increase production in the processing apparatus.

A more specific object is to provide the combination with a processing apparatus which delivers rotating, elongated workpieces axially along a predetermined path, of a plurality of skewed rolls spaced along the path to support the workpiece. Guide means at one side of the path confines the workpiece against lateral movement in one direction. The skewed rolls are driven to eject the workpiece sidewise in the other direction when it clears the processing apparatus and stops its rotation.

In accomplishing these and other objects of the invention, I have provided a preferred form of apparatus shown in the accompanying drawings. In the drawings:

FIGURE 1 is a plan view, showing the combination of invention comprising a rotary pipe straightener, guide means and a plurality of skewed rolls to move the pipe laterally to discharge means;

FIGURE 2 is a plan view, showing an enlarged portion of FIGURE 1, including a lateral guide for the pipe and a pivoted plate supporting a skewed roll and motor; and FIGURE 3 is a vertical sectional view taken on line III—III of FIGURE 2, showing vertically and laterally adjustable support means and the supported skewed rolls, lateral guide and apron plate.

As shown in FIGURE 1, a rotary crossed-roll straightener 10, which is commercially available, delivers a straightened, rotating pipe length 11 through an outlet guide 12 to a runout table or conveyor 13. By means to be described, some time after a pipe length clears the straightener, it is delivered sidewise from the predetermined path it has been following, to an apron 14 and spaced skids 15 for further processing.

As shown in FIGURES 1, 2 and 3, outlet table 13, which may comprise individual sections, comprises a plurality of skewed rolls 16 spaced along the predetermined path of the pipe, as a support therefor. Extending between rolls 16 and spaced just below the line of pipe-roll contact are runout apron plates 17. They support the pipe from below between the adjacent rolls. The straightener produces rapid, counterclockwise rotation, tending to move the pipe to the left, as viewed in FIGURE 3. A lateral guide or backstop 18 opening inwardly toward the path of travel, confines the pipe and maintains its straightness. Guide 18 may comprise a replaceable angle iron bolted to a supporting angle iron 19.

The above elements are supported on a structure that is vertically and laterally adjustable, usually to compensate for equipment wear and to maintain the correct axial path when a pipe size is changed. For example, a base plate 20 supports longitudinally-spaced pairs of worm-gear jacks 21, 22 that are simultaneously operated in known manner by hand wheels 23 to raise and lower jack plates 24, 25 on which rest transverse channel members 26. Each member 26 slidingly supports spaced plates 27, 28 and has attached at the ends thereof blocks 29, 30, threaded to receive set screws 31, 32. The plurality of longitudinally-spaced plates 27 support a longitudinal beam 33. Plates 28 support a beam 34. The parallel beams 33, 34 are braced at spaced points therealong by transverse members 35. The described supporting structure for the grid composed of beams 33, 34 and their bracing members 35 is omitted from FIGURES 1 and 2 to avoid unnecessarily complicating the showings thereof. When the grid is to be moved transversely, one set screw is loosened, the other set screw being then advanced the required distance. The set screws are then tightened against the respective beams.

Lateral guide 18 and angle iron 19 are supported at spaced points along beam 34 by clamping brackets 37, 38 and a connecting post 39. Vertical members 40 spaced along beams 34 support run-out plates 17 and apron 14. Spaced skids 15 are supported by means of vertical members 41 on a base, not shown.

A plurality of plates 42 are spaced along beams 33, 34. A skewed roll 16 is supported on each plate 42 by bearing blocks 43, 44. Some of the rolls 16 are idler rolls, other are driven through couplings 45 by motors 46. Each plate 42 pivots on a pin 47 attached to beam 34. A plurality of slots 48 cut in plates 42 adjacent the corners thereof, receive bolts 49 that also pass through spaced holes or slots 50 cut in beams 33, 34. By means of the bolts and slots, a plate 42 may be tightened on beams 33, 34 in any one of several preferred angular positions. A plate 42 may be adjustably fixed between the position shown in chain lines in FIGURE 2, the actual position shown and therebeyond.

The directional arrow 51 subtends an arc of about 30° described by the major axis 52 of a plate 42 in pivoting on pin 47 from the chain line position, that is normal to the axial pathway of the pipe lengths, to an angle of 30° thereto as actually shown. In the latter position the axis is at an angle of 60° to the direction of pipe travel. A vertical plane passed through axis 52 would intersect the horizontal axis of skewed roll 16, the center of pin 47 and the point of contact between a pipe and the face of roll 16.

As stated hereinabove, commercially available rotary straighteners have the axes of their concave-surfaced rolls set in the axial direction the pipe travels and usually between about 25° and 40° thereto, although the range for any one straightener is usually smaller. Smaller pipe are straightened at the lower end of the range and larger pipe at the higher end, by opening the space between the rolls and by adjusting the angles of the roll axes to produce the maximum length of contact with the pipe. The powerful grip of the straightener rolls in straightening a pipe length, produces rapid rotation as well as longitudinal movement in the pipe. The leading end of the gripped pipe and thereafter the whole pipe length tends to roll in the direction of rotation, which is counterclockwise as shown in FIGURE 3. The pipe is confined against lateral movement in this direction by the lateral guide 18 and kept straight.

I have found that when the supporting rolls for the pipe are skewed, that is, their axes are at an angle to the normal 90° angle to the axial path of the pipe and the rolls are driven in a direction opposite to pipe rotation, as soon as a pipe length delivered from a straightener has ceased rotation, the length will be quickly discharged sidewise from its axial path in a direction opposite its previous rotation, without interfering with the next pipe length. Theoretically, if the skewed roll axes were set at the same angle and the rolls were driven at the same speed as the straightener rolls, the rotating pipe coming from the straightener would maintain itself in a relatively straight axial path on the skewed rolls. However, it is important to confine the pipe as hereinabove described to keep it straight under practical operating conditions. It is therefore preferred to maintain the range of angles at which the skewed roll axes are set between less than about 90° and more than about the angle made by the axes of the straightener rolls to the axial path of the pipe lengths. A practical range would be between about 45° and 80° to allow for such conditions as change in pipe diameters, slight misalignment in the straightener, the handling of relatively long, flexible lengths of pipe and variable roll speeds with attendant flexibility in the point a pipe length is discharged sidewise. A specific example of the use of my apparatus is set forth below.

Rotary straightener 10 in one instance has its roll axes inclined at an angle of about 35° to the axial path of a 2⅜" outside diameter pipe 11 being straightened. The pipe is about 42' long (double length) and is discharged from the straightener at an axial speed of about 700 f.p.m., and at about 1770 r.p.m. The surface speed of rotation of the periphery of the pipe is about 1100 f.p.m. Beyond the outlet guide 12, the pipe length is supported on spaced rolls 16, 8" wide and tapering from 12" to 11½" in diameter. Skewed rolls 16, their axes inclined at an angle of about 60° to the axial path of the pipe are driven at about 263 r.p.m., the surface speed being about 810 f.p.m., the axial path component thereof being about 700 f.p.m., the axial speed of the pipe. The ten skewed rolls shown in FIGURE 1 are spaced about 5' apart. The first two rolls are driven, then idler rolls alternate with driven rolls for a total of six driven rolls and four idler rolls. Under the described conditions, pipe length 11 rotates in contact with and is confined against lateral movement and maintained straight by lateral guide 18 while being straightened and after it is discharged from the straightener and has traveled beyond the outlet guide. When the trailing end is about 20' beyond the straightener, the pipe rotation ceases and within a distance of about 2' to 3', the skewed rolls discharge it to apron 14.

While the above example illustrates a preferred method of operating the apparatus, other changes in apparatus or its operation may be effected without departing from the spirit of the invention. Under the described conditions and for any given piece of pipe, its inertia after discharge from the straightener will continue rotating it for about the same time. Hence, if the roll speed is decreased, the pipe may be ejected sooner, and vice versa. Thus, a 21' length of 2⅜" O.D. pipe may be ejected just beyond the outlet guide by decreasing the axial component of the roll speed to about 500 f.p.m. Conversely, with an axial component of about 1000 f.p.m. the same length may be ejected at the far end of the conveyor. Compared with a 2⅜" O.D. pipe, a 4½" O.D. pipe having a greater mass and period of rotation would require respective decrease and increase in roll speeds to discharge the pipe in substantially the same positions. It must be understood, of course, that with a decrease in axial speed below that of the straightener, it is not possible to attain a primary advantage of my invention, namely, the maximum utilization of the straightener in feeding pipe lengths thereto in substantially abutting relationship.

Ordinarily, the pipe will be discharged in substantially parallelism with its axial path. However, the leading end of the pipe may get ahead for a number of reasons, for example, when handling relatively long lengths of flexible material or when the straightener is maladjusted. This condition may be overcome by increasing the angle of inclination to the axial path of the latter rolls in the series. For example, the angle of the axes of the last three or four rolls may be increased from 60° in the initial rolls to 80° in the latter rolls. An effective relationship may be found where the initial rolls have a different inclination.

In the example, six driven rolls and four idler rolls are employed. The apparatus has operated satisfactorily when alternating five driven with five idler rolls. While all the rolls may be driven, there is little apparent improvement in efficiency. The number of driven rolls may be increased as required, when pipe is to be slowed down or speeded up, more than discussed above, especially when handling heavier pipe. The pipe-roll friction serves to turn the idler rolls in the same direction as the driven rolls and to aid in discharging a pipe length when its rotation has ceased. The conical skewed rolls in the example may be replaced by cylindrical or even barrel-type rolls. There would be little change in effectiveness between these rolls, unless the contour of a conical or barrel-type roll were changed radically. While the invention has been described specifically as a combination of a straightener and pipe, the principles thereof apply to the handling of rods and other rounds. Similarly the invention is applicable to other processing apparatus such as grinders and polishers for round elongated workpieces delivering them rotating and moving axially along a predetermined path.

The invention is characterized by several distinct advantages. In the first place, at a controlled distance beyond the processing apparatus, a workpiece may be rapidly discharged sidewise from its axial path to an inclined apron where it quickly loses forward motion, then rolls downwardly for further processing. Secondly, the sidewise discharge is effected without interference with the next oncoming workpiece, hence the processing apparatus may be operated at maximum capacity. Finally, workpieces may be discharged without additional auxiliary apparatus, in less floor space and without damage thereto.

Although I have disclosed herein the preferred embodiment of my invention, I intend to cover as well any change or modification therein which may be made without departing from the spirit and scope of the invention.

I claim:

1. The combination of a skewed-roll conveyor with processing apparatus delivering rotating, elongated workpieces axially along a predetermined path comprising supporting means, a plurality of skewed rolls mounted on said supporting means and spaced along said path, continuous confining means opening inwardly toward said path and at one side thereof adapted to confine therein said workpieces having lateral rotational movement in one direction and to maintain said rotating workpieces substantially straight, means driving said skewed rolls in a direction opposite to the rotation of said rotating workpieces whereby to discharge said workpieces laterally from said path in an opposite direction when said workpieces clear said apparatus and stop their rotation, and a continuous skid plate mounted on said supporting means parallel to and adjacent said path adapted to stop said workpieces after discharge thereof from said skewed rolls.

2. Apparatus as defined in claim 1 characterized by said confining means comprising an angle iron mounted on said supporting means.

3. Apparatus as defined in claim 1 characterized by alternate skewed rolls, one being driven, the other being an idler roll.

4. Apparatus as defined in claim 1 characterized by a group of said rolls adjacent the exit end of said conveyor having their axes inclined to said path at an angle greater than that at which the axes of a preceding group of said rolls are inclined.

5. Apparatus as defined in claim 4 characterized by said inclination of the axes of the rolls of said first-mentioned group being about 80° and about 60° for said second-mentioned group.

References Cited by the Examiner

UNITED STATES PATENTS

| | | | |
|---|---|---|---|
| 701,024 | 5/02 | Edwards | 198—107 |
| 1,352,766 | 9/20 | Sheperdson | 198—107 X |
| 1,831,508 | 11/31 | Quinn | 198—107 |
| 2,018,089 | 10/35 | Quarnstrom | 198—105 X |
| 2,163,669 | 6/39 | Didden | 153—108 |
| 2,384,457 | 9/45 | Dewey. | |
| 2,650,694 | 9/53 | Findlater | 198—104 |
| 2,726,754 | 12/55 | Rodder | 198—104 |
| 2,940,503 | 6/60 | Abramsen | 153—108 |

SAMUEL F. COLEMAN, *Primary Examiner.*

WILLIAM B. LA BORDE, *Examiner.*